No. 739,925. Patented September 29, 1903.

UNITED STATES PATENT OFFICE.

CASPAR PRANGEMEIER, OF MUNSTER, GERMANY.

APPARATUS FOR MEASURING AND DRAWING OFF LIQUIDS.

SPECIFICATION forming part of Letters Patent No. 739,925, dated September 29, 1903.

Application filed April 6, 1903. Serial No. 151,419. (No model.)

*To all whom it may concern:*

Be it known that I, CASPAR PRANGEMEIER, engineer, a subject of the King of Prussia, Emperor of Germany, and a resident of Nos. 41 and 42 Katthagen, Munster, in the Empire of Germany, have invented new and useful Improvements in Apparatus for Measuring and Drawing Off Liquids, of which the following is a specification.

The present invention relates to improvements in apparatus for measuring and drawing off liquids into a plurality of vessels.

Special objects of the invention are to simplify and cheapen the construction and to render more efficient, serviceable, and durable in operation devices of the kind referred to.

With these ends in view the invention consists in the novel combination, arrangement, and adaption of parts, all as more fully hereinafter explained, shown in the accompanying drawings, and then specifically set out in the appended claims.

Figure 1:
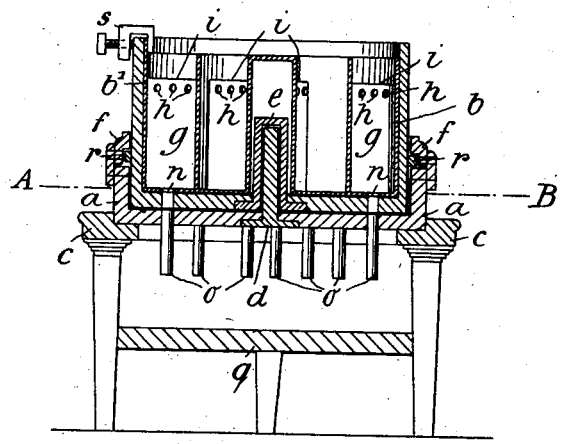
Figure 2:
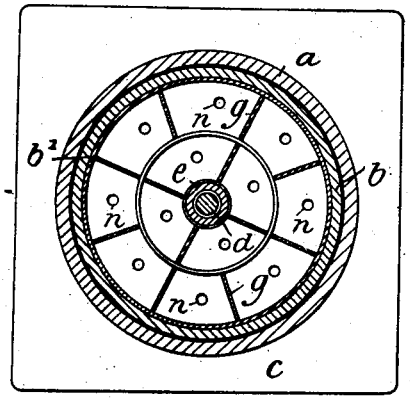
Figure 3:
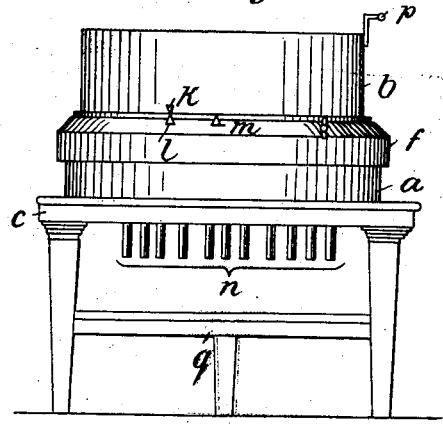

As an example of carrying the invention into practice, Figure 1 of the drawings shows a central vertical section through the apparatus. Fig. 2 represents a horizontal section through the apparatus on line A B of Fig. 1. Fig. 3 is an external front elevation of the apparatus.

The improved apparatus for measuring and drawing off liquids according to the present invention comprises, essentially, the two cylindrical vessels $a$ and $b$, which are mounted on a table $c$ of suitable material and construction. The inner vessel $b$ is placed and rotatable in the outer vessel $a$. The bottom of the inner vessel $b$ slides smoothly with its lower surface on the bottom of the outer vessel $a$. A pin $d$, centrally projecting from the bottom of the vessel $a$, engages a tube $e$ of the vessel $b$. The said tube $e$ is closed at its top end and terminates with its lower open end at the under surface of the vessel $b$. The vessel $a$ is further provided with an annular projection $f$, which fits over an annular rib $r$ on the vessel $b$. The tube $e$ with the pin $d$ and the annular projection $f$ with the annular rib $r$ serve for the proper and smooth guidance of the vessel $b$ in the vessel $a$.

In the interior of the vessel $b$ is placed a likewise cylindrical vessel $b'$, having openings or being totally open at the bottom. This vessel $b$ is subdivided into a plurality of compartments by means of partitions $g$. The various compartments are in connection with one another by holes $h$ in the partitions $g$. Measuring-marks $i$ for the contents are indicated on the partitions $g$ on a like elevation and above the holes $h$. The vessel $b'$ is secured in the vessel $b$ by suitable clamping means $s$. On the external surface of the vessel $b$ an index $k$ is provided and below same on the vessel $a$ or the annular projection $f$, respectively, two marks $l\,m$ are shown, which serve for indicating the positions of the vessels $a$ and $b$ in regard to one another. The bottom of the vessels $b$ shows an opening $n$ for each of the compartments made by the partitions $g$, as previously described. The openings in the bottom of the vessel $b$ correspond in number and position and register with the mouths of tubes $o$, inserted through openings in the bottom of the vessel $a$ when the index $k$ of the vessel $b$ is over the mark $l$ of the vessel $a$.

For filling the vessel $b$ the latter is rotated in the vessel $a$ by means of the handle $p$ until the index $k$ is located over the mark $m$. In this position the openings $n$ in the bottom of the vessel $b$ and the tubes $o$ in the vessel $a$ do not register, so that the contents remain in the vessel $b$.

The compartments will be uniformly filled up to the measuring-marks $i$, owing to the holes $h$ in the partitions $g$ below said marks. After placing the receiving vessels (bottles and the like) on a plate $q$ of the table $c$ below the tubes $o$ the turning back of the vessel $b$ until the index $k$ registers with the mark $l$ suffices to automatically draw off the contents of the various compartments through the openings $n$ and tubes $o$ into the vessels placed below.

What I do claim as my invention, and desire to secure by Letters Patent, is—

1. Improved apparatus for measuring and drawing off liquids into a plurality of vessels, comprising in combination an outer vessel $a$ placed on a suitable table $c$, an inner vessel $b$ rotatable in the vessel $a$, means for smoothly guiding the vessel $b$ in the vessel $a$, a plurality of bores $n$ in the bottom of the vessel $b$ and a corresponding number of tubes $o$ terminating on the inner surface of the bottom of the vessel $a$, said bores $n$ adapted to register with the tubes $o$ to draw off uniform quantities into vessels placed below the tubes $o$, substantially as described and shown.

2. Improved apparatus for measuring and drawing off liquids into a plurality of vessels, comprising in combination an outer vessel $a$ placed on a suitable table $c$, an inner vessel $b$ rotatable in the vessel $a$, a vessel $b'$ secured in the vessel $b$, partitions $g$ subdividing the vessel $b'$ into a plurality of compartments, means for smoothly guiding the vessel $b$ in the vessel $a$, a plurality of bores $n$ in the bottom of the vessel $b$ one for each of the compartments of the vessel $b'$, and a corresponding number of tubes $o$ terminating on the inner surface of the bottom of the vessel $a$, said bores $n$ adapted to register with the tubes $o$ to draw off uniform quantities into vessels placed below the tubes $o$, substantially as described and shown.

3. In an improved apparatus for measuring and drawing off liquids into a plurality of vessels, comprising in combination an outer vessel $a$ placed on a suitable table $c$, an inner vessel $b$ rotatable in the vessel $a$, means for smoothly guiding the vessel $b$ in the vessel $a$, a plurality of bores $n$ in the bottom of the vessel $b$ and a corresponding number of tubes $o$ terminating on the inner surface of the bottom of the vessel $a$, said bores $n$ adapted to register with the tubes $o$ to draw off uniform quantities into vessels placed below the tubes $o$, an index $k$ and two marks $l$, $m$ in connection with the vessels $a$ and $b$ to indicate the two extreme positions of the vessel $b$, substantially as described and shown.

In witness whereof I have hereunto signed my name, this 22d day of November, 1902, in the presence of two subscribing witnesses.

CASPAR PRANGEMEIER.

Witnesses:
  WILLIAM ESSENWEIN,
  PETER LIEBER.